United States Patent [19]
Milam

[11] Patent Number: 5,851,313
[45] Date of Patent: Dec. 22, 1998

[54] CASE-HARDENED STAINLESS STEEL BEARING COMPONENT AND PROCESS AND MANUFACTURING THE SAME

[75] Inventor: David L. Milam, North Canton, Ohio

[73] Assignee: The Timken Company, Canton, Ohio

[21] Appl. No.: 718,138

[22] Filed: Sep. 18, 1996

[51] Int. Cl.$^6$ ...................................................... C23C 8/36
[52] U.S. Cl. ........................... 148/222; 148/319; 148/906
[58] Field of Search ................................... 148/906, 222, 148/319; 384/492, 625

[56] References Cited

U.S. PATENT DOCUMENTS

| | | |
|---|---|---|
| 4,853,046 | 8/1989 | Verhoff et al. . |
| 4,861,442 | 8/1989 | Nishihama et al. . |
| 5,002,729 | 3/1991 | Wert et al. . |
| 5,122,000 | 6/1992 | Matsumoto et al. . |
| 5,127,967 | 7/1992 | Verhoff et al. . |
| 5,137,375 | 8/1992 | Murakami et al. . |
| 5,292,200 | 3/1994 | Matsumoto et al. . |
| 5,383,980 | 1/1995 | Melber et al. . |
| 5,503,687 | 4/1996 | Berns . |

FOREIGN PATENT DOCUMENTS

| | | |
|---|---|---|
| 0548760A1 | 6/1993 | European Pat. Off. . |
| 1266970B | 3/1972 | United Kingdom . |
| 2310466 | 8/1997 | United Kingdom . |

*Primary Examiner*—Scott Kastler
*Attorney, Agent, or Firm*—Polster, Lieder, Woodruff & Lucchesi, L.C.

[57] ABSTRACT

A stainless steel bearing component containing in excess of 11% chromium and between 0.05% and 0.50% carbon is case-hardened by introducing carbon or nitrogen into the surface of the race using a plasma process. The component is heated in a chamber from which air is evacuated. There it is bombarded with hydrogen ions to clean its surface. Next, while the component remains at an elevated temperature, a gas containing carbon or nitrogen or both is introduced into the chamber where it exists at a relatively low pressure on the order of 2–9 torr. A plasma is produced intermittently, and it causes carbon or nitrogen or both to diffuse intio the surface of the component and create a case containing a greater proportion of carbon or nitrogen than the underlying core. Thereafter, the component is cooled and with most stainless steels this may be acheived by quenching in oil. Where the case is enriched in carbon, the component is thereafter reheated to a temperature where its core exists as single phase austenite and held at that temperature to effect a soak. An oil quench follows and it converts much of the austenite to martensite. The quench in turn may be followed by cryogenic cooling to convert retained sustenite into martensite. After assuming ambient temperature, the component is again heated to temper the hardened case.

18 Claims, 1 Drawing Sheet

CASE-HARDENED STAINLESS STEEL BEARING COMPONENT AND PROCESS AND MANUFACTURING THE SAME

BACKGROUND OF THE INVENTION

This invention relates in general to bearings and more particularly to a case-hardened stainless steel bearing component and method of manufacturing the same.

Bearings made of low alloy steel are not inherently resistant to corrosion. Their alloying elements do not form an adherent oxide film that is impervious to either oxygen or water. Oxygen combines chemically with the iron in the steel to form oxides of iron. These oxides are porous and permit additional oxidation of iron to occur through the oxide.

Bearings can be protected from corrosion by coating them with a barrier to oxidation or water. Examples are coating the components with oil or wrapping them in a fibrous material that contains an oxygen "getter". These barriers are temporary and do not provide a durable means of corrosion protection when the bearings are placed into service. Another means of providing a barrier to oxygen and water is to apply a more durable coating to the components, such as those known by the trademarks Thin Dense Chrome or CorroBan which is actually a zinc-nickel alloy. These coatings persist on the surface of the bearing components.

It is possible to fabricate bearings with an inherent resistance to corrosion by selecting a martensitic stainless steel that has a high chromium content. The selected steel should contain a minimum of 15% chromium to provide significant resistance to corrosion by water. A widely used steel for this purpose is 440C stainless steel. This steel contains a nominal 1.0% carbon concentration. Bearing components made from this material are austenitized, quenched, and tempered. The resultant bearing component is through-hardened, that is, the hardnesses of the surface and interior are similar.

The existence of high hardness throughout the component is a result of the carbon concentration being uniform throughout the component. A high hardness existing in the interior of a bearing component is satisfactory for many, but not all, applications. In some applications a uniformly hard bearing component is not desirable because of its propensity for easy crack propagation. The high DN application in jet engines is one such application wherein a uniformly high hardness is undesirable.

Corrosion-resistant bearing components containing a minimum of 15% chromium and possessing greater fracture roughness can be produced by carburizing, carbonitriding, or nitriding a bearing component. Depending upon the chemical composition of the steel, it may be necessary to reheat the component, quench, and temper. A bearing component so formed possesses a hard case and a more ductile core.

Corrosion-resistant bearings made of case-hardened components exist, but require complex heat treatments. The complexity derives from the limitations of gas carburizing and gas nitriding. Firstly, the high chromium-containing steel forms an oxide at the surface upon heating to the elevated temperatures required for carburizing or nitriding, and this oxide is impervious to carbon and nitrogen. Either a case cannot be produced or its formation to useful depths requires an inordinate period of time.

The formation of the oxide film during heating in a furnace is prevented in practice by first oxidizing the bearing component in air and then cooling to ambient temperature. This creates another oxide of iron which is permeable to diffusion of carbon. When this preoxidized component is heated subsequently for carburizing, no other oxide film can form and relatively easy diffusion of either carbon or nitrogen occurs. In this manner, the bearing component can be treated prior to the diffusion treatment, causing inward diffusion of carbon or nitrogen to occur. But this prior oxidation is an extra step in the manufacturing process, and the cost of manufacturing is increased accordingly. Furthermore, the preoxidation process is sensitive to the parameters of the process, causing the results of preoxidation to vary.

There is another problem with conventional case-hardening of high chromium-containing bearing components. Contaminants existing on the surface can persist after heating to the carburizing temperature, and these contaminants can prevent the formation of a carburized or nitrided depth below them. Consequently, a nonuniform case depth results from the presence of these persistent contaminants. Finger prints have been sufficient to prevent diffusion of carbon or nitrogen. Stringent cleaning procedures for the bearing component must be followed for conventional case hardening.

Still another problem associated with the conventional process of case hardening high chromium-containing steels is the formation of continuous grain boundary carbide networks in response to the increase in carbon concentration caused by the carburization treatment. These grain boundary carbide networks are deleterious to bearing performance. This fact is recognized by those knowledgeable in the art, and steps are taken to prevent the formation of the network. Formation of the grain boundary network is suppressed by maintaining a "low" concentration of carbon at the surface of the bearing components during carburization. That is, the "carbon potential" of the gaseous atmosphere within conventional gas carburizing furnaces is maintained at a "low" value. The time duration of the conventional carburizing treatment is lengthy because of the low carbon potential and the chemical process used to supply carbon to the surface of the bearing components.

There is yet another problem encountered when bearing components are carburized via the conventional process. It is well-known that the addition of carbon to a martensitic stainless steel is desirable for increasing hardness, but the addition of carbon can cause chromium carbides to form. This formation of chromium carbide particles reduces the concentration of chromium dissolved in the steel and detracts from its capacity to resist corrosion where the resistance is needed most. Thus, it is necessary to reduce the carbon potential further to maintain resistance to corrosion. Consequently, the duration of the carburization cycle is increased still further.

Finally, there is a problem with obtaining a hardness of 60 HRC in the conventional carburization and reheating process for high chromium-containing steels. The high concentration of chromium and the increased concentration of carbon dissolved in the austenite causes excessive austenite to be retained when the component is reheated and quenched. It is conventional practice to cool the bearing components after this reheat and quench to −120° F. to force the austenite to transform to martensite. But this terminal temperature may be too high for optimum transformation of austenite to martensite to occur.

Thus it is possible to fabricate case-hardened, corrosion-resistant bearing components from low carbon martensitic stainless steels, but not without problems.

The present invention resides in a bearing component that is formed from stainless steel and has a hard case over a softer and more ductile core. The case is derived from a plasma procedure by which carbon or nitrogen or both are diffused through the surface of the component to increase the carbon or nitrides in the region of the surface. In the case of carbon a subsequent heat treatment of this region creates a hardened case. The invention also consists in the parts and in the arrangements and combinations of parts hereinafter described and claimed.

BRIEF DESCRIPTION OF THE DRAWINGS

In the accompanying drawings which form part of the specification and wherein like numerals and letters refer to like parts wherever they occur.

DETAILED DESCRIPTION

Figure 1:
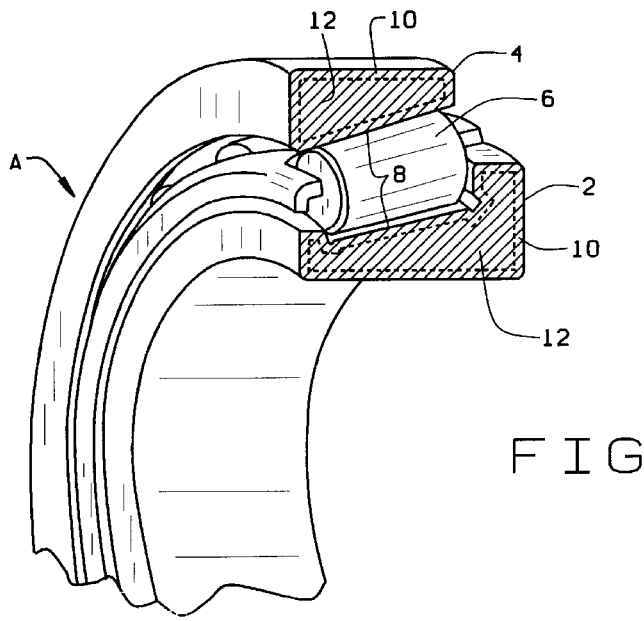
FIG. 1 is a fragmentary perspective view, partially broken away and in section, of a bearing having case-hardened components manufactured in accordance with and embodying the present invention.

An antifriction bearing A (FIG. 1) has an inner race 2, an outer race 4, and rolling elements 6 arranged in a row between the races 2 and 4. All three represent components of the bearing A. The races 2 and 4 have raceways 8 where the rolling elements 6 actually contact the races 2 and 4, and it is along these regions of contact that the races 2 and 4 and the rolling elements 6 experience their greatest stresses. To enable the races 2 and 4 to withstand the stresses and resist wear, while still possessing a measure of ductility, each race 2 and 4 is case-hardened. Sometimes, the rolling elements 6 are also case-hardened, particularly in larger bearings A. As a consequence of the case-hardening each race 2 and 4 has a hard case 10 over which its surface area extends and a softer, yet tougher, core 12 that lies within the case 10. No distinct demarcation exists between the case 10 and the core 12; the case 10 simply fades into the core 12.

In addition to having the capacity to withstand high stresses and resist wear, the races 2 and 4 also have the capacity to operate in corrosive environments without experiencing significant corrosion. These capabilities derive from a stainless steel containing 0.05% to 0.50% carbon, 11% to 18% chromium and other alloying elements, all in addition to iron. The proportions, which are by weight, of course refer to the cores 12 in the races 2 and 4. The cases 10 possess somewhat different proportions, having a greater amount of carbon or nitrides or both. The races 2 and 4 exist initially as machined shape of uniform metallurgical constituency, which is the constituency of the cores 12 in the final races 2 and 4. To acquire the cases 10 more carbon or nitrogen is introduced into the races 2 and 4 by a plasma deposition process. Where carbon is added, the races 2 and 4 are subjected to heat treatments suitable for hardening the reconstituted regions, that is the cases 10.

Figure 2:
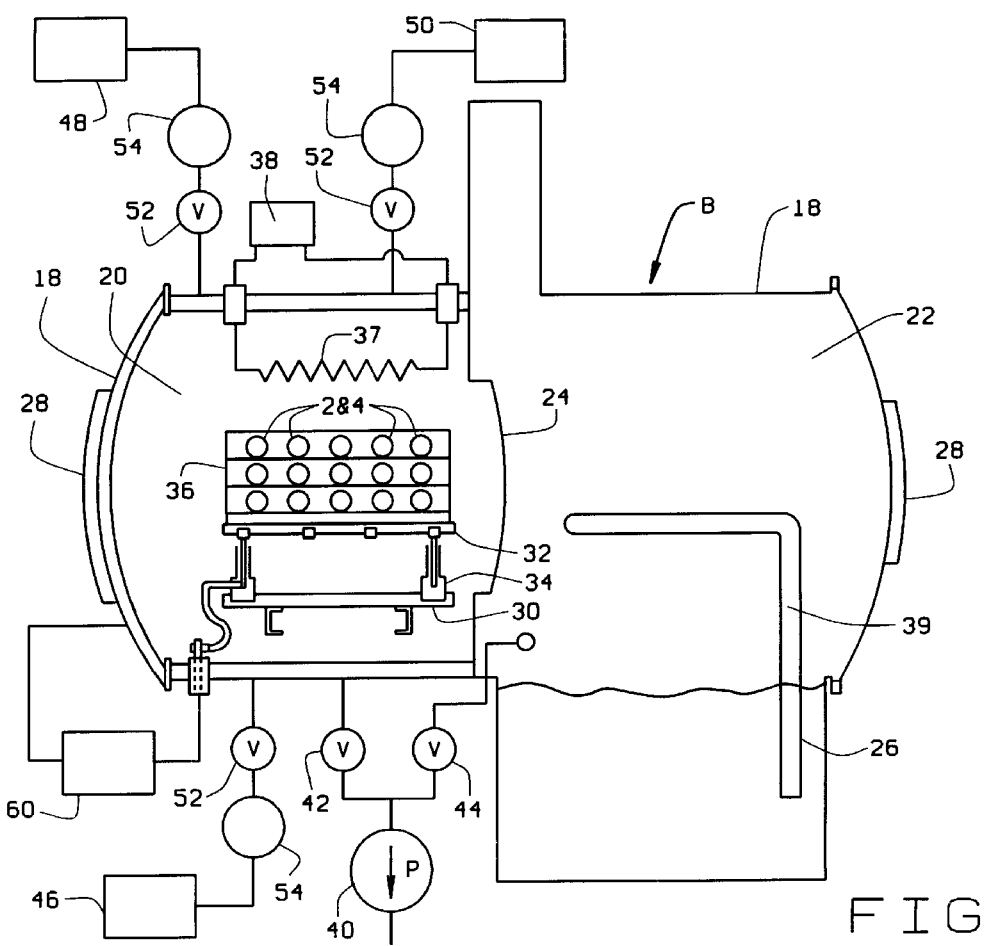
FIG. 2 is a schematic view of a furnace in which bearing components are subjected to a plasma deposition procedure.

The procedure for the most part takes place in a plasma carburizing furnace B (FIG. 2) having steel walls 18 that enclose a heating chamber 20 and a quenching chamber 22. One of the walls 18 separates the two chambers 20 and 22, and that wall contains an opening that is normally covered by a panel 24. But the panel 24 may be displaced, and when so displaced allows objects to be moved between the chambers 20 and 22. The quenching chamber 22 extends below the heating chamber 24, and in this depressed region is filled with an oil 26 that is suitable for effecting an oil quench of steel. Access to the heating and quenching chambers 20 and 22 is provided through doors 28 in the walls 18 at the ends of the chambers 20 and 22, thus enabling the races 2 and 4 to be introduced into and removed from the chambers 20 and 22.

The heating chamber 20 contains a hearth 30 having elevated rails 32 which are electrically isolated from the walls 18 of the chamber 20 by insulators 34. The rails 32 support baskets 36 that hold the races 2 and 4. The baskets 36 may be moved along the rails 32, through the opening normally covered by the panel 24, and into the quenching chamber 22. The heating chamber 20 also contains an electrical resistance heater 37 which is exposed to the baskets 36 and connected to a power supply 38 through controls. The quenching chamber 22 contains a material handling device 39 which has the capacity to reach into the heating chamber 20, through the opening normally covered by the panel 24, to deposit the baskets 36 on the rails 32 and to remove them from the rails 32. Indeed, the device 39 moves baskets 36 between the two chambers 20 and 22.

Both chambers 20 and 22 are connected with a vacuum pump 40 through valves 42 and 44, respectively. The heating chamber 20 further communicates with a source 46 of hydrogen, with a source 48 of a carburizing or nitriding gas, and with a source 50 of argon, each through a valve 52 and a mass flow controller 54.

Finally, the heating chamber 20 is connected to an electrical power supply 60 which can be quickly turned off or on. The arrangement is such that rails 32 of the hearth 30 serve as the cathode, whereas the metal walls 18 which enclose the chamber 20 form the anode. The metal baskets 36, being supported on the rails 32, exist at the same electrical potential as the rails 32 and likewise form part of the cathode, as do the stainless steel races 2 and 4 which are in the baskets 36.

The case hardening procedure begins with at least one race 2 or 4, or more likely multiple races 2 and 4—actually shapes—which have been machined to the desired size and configuration from a suitable stainless steel. That steel contains 0.05% to 0.50% carbon by weight, 11% to 18% chromium by weight, and the remainder for the most part iron. Its constituency is uniform throughout the machined shapes or races 2 and 4 and is that which is desired for the core 12 of the races 2 and 4. The machined shapes or races 2 and 4 of uniform constituency should be reasonably clean in the sense that they are free from debris and films, but no special cleansing procedures are undertaken.

The clean races 2 and 4 of uniform constituency are placed in the baskets 36, and the baskets 36 are inserted into the quenching chamber 22 through the opening normally covered by the door 28 at the end of that chamber 22. Indeed, the baskets 36 are placed on the material handling device 39 in the chamber 22. The door 28 at the end of the chamber 22 is closed. Next, with the valve 42 open, the vacuum pump 40 is energized long enough to reduce the pressure in the heating chamber 20 to about 1 torr. Thereupon, the valve 44 is opened and the quenching chamber 22 is likewise evacuated until its pressure reaches about 1 torr. Next the closure panel 24 is moved so that the quenching chamber 22 is exposed to the heating chamber 20 through the opening normally closed by the panel 24. The material handling device 39 moves the baskets 36 from the quenching chamber 22 into the heating chamber and deposits them on the rails 32, whereupon it withdraws into quenching chamber 22. Next the closure panel 24 is moved to the condition in which it closes and seals the chamber 20. The vacuum pump 40 remains energized with the valve 42 to the heating chamber 20 being open and the valve 44 to the quenching chamber 22 being closed. The valve 52 and mass flow controllers 54 remain closed. As a consequence, the pump 40 evacuates the heating chamber 20 still further, reducing pressure in the chamber 20 to about 0.02 torr.

While the heating chamber 20 remains under a high vacuum, the heater 37 is energized long enough to elevate the temperature of the races 2 and 4 to the carburizing temperature for the stainless steel of the races 2 and 4, and this temperature generally ranges between 900° F. and 2000° F. The heater 37 remains energized, at least on an intermittent basis, to maintain the races 2 and 4 at the desired carburizing temperature. By reason of the vacuum, substantially all of the heat required to elevate the temperature of the races 2 and 4 transfers to the races 2 and 4 by radiation. The vacuum of course represents an absence of oxygen and other gases, so no oxygen exists within the chamber 20 to react with the iron of the races 2 and 4 and produce an oxide film over their surfaces. It will be recalled that stainless steel, when heated to the carburizing temperature in a conventional carburizing furnace, reacts with oxygen to form an oxide film that is impervious to carbon. This problem is conventionally overcome by first heating the stainless steel in air to form a different oxide that is porous to carbon, and then heating it in a carburizing furnace. Heating the races 2 and 4 in the evacuated chamber 20 eliminates the requirement for a porous oxide, and of course eliminates the cost of the additional step required to obtain it.

To be sure, the races 2 and 4 are reasonably clean, but not clean enough to prevent arcing in the presence of a plasma containing carbon or nitrogen—and arcing of that character will disrupt a plasma and may damage the races 2 and 4. To enhance the cleanliness of the surfaces on the races 2 and 4, further cleaning occurs within the heating chamber 20 of the furnace B. To this end, the valve 52 that isolates the source 46 of hydrogen from the chamber 20 is opened and enough hydrogen is admitted to the heating chamber 20 to raise its pressure to between 2 torr and 9 torr.

Next the ion power supply 60 is energized to, in effect, sputter clean the surfaces of the races 2 and 4, all while the temperature of the races 2 and 4 remains elevated at the desired carburizing temperature. In other words, the races 2 and 4 are subjected to an impingement of hydrogen ions for a duration sufficient to remove all contaminants from the surfaces of the races 2 and 4 and the electrical insulators 34. The duration of the sputter cleaning depends on the cleanliness of the races 2 and 4 and insulators 34, but usually 30 to 60 minutes will suffice. Owing to the ion pressure and elevated temperature, the hydrogen does not remain with the steel and hence no hydrogen embrittlement occurs.

Once cleaned, the races 2 and 4 undergo carburizing or nitriding within the chamber 20 while at the elevated temperature. To this end, the valve 42 is opened, and the vacuum pump 40 is energized to withdraw the hydrogen from the heating chamber 20. The valve 52 and mass flow controller 54 that isolate the source 48 of carbon or nitrogen are likewise opened to admit a gas containing carbon or nitrogen or both into the heating chamber 20, all while the vacuum pump 40 remains energized such that the gas flows through the chamber 20 at a pressure ranging between 2 torr and 9 torr. Suitable gases for supplying carbon are methane or propane. Pure nitrogen derived from high pressure cylinders is an acceptable source of nitrogen N. Whether the gas supplied from the source 48 furnishes carbon or nitrogen, it should be mixed with hydrogen and argon in the heating chamber 20 to provide additional electrons for better initiating and sustaining a plasma. To this end the valves 52 which isolate the sources 46 and 50 of hydrogen and argon are opened and the flow controllers 52 associated with them are set to admit a small amount of hydrogen and argon to the chamber 20. The heater 37 remains energized and maintains the temperature of the races 2 and 4 at the selected carburizing temperature which should be between 900° F. and 2000° F.

Once the flow of carburizing or nitriding gas is established, the power supply 60 is also energized, and it establishes the races 2 and 4 as a cathode and the metal walls 18 of the chamber 20 as an anode. A plasma develops within the chamber 20 and the carbon- or nitrogen-containing gas disassociates, whereupon a deposits of carbon or nitrogen or both is left on the races 2 and 4. Indeed, the carbon or nitrogen diffuses into the races 2 and 4 at their surfaces and thus increases the carbon or nitrogen content of the steel in the region of the surface areas of the races 2 and 4. The diffusion in effect creates on each race 2 and 4 a case 10 having a carbon or nitrogen content which diminishes with depth until the case 10 finally fades into the core 12 having the constituency of the original machined shape.

The ion power supply 60 has the capacity to be turned off and on quite rapidly and the same holds true with regard to the mass flow controllers 54. They permit one to control with considerable precision the amount of carbon- or nitrogen-bearing gas and the amount of hydrogen and argon introduced into the chamber 20. Both the power supply 60 and the controllers 54 should be manipulated such that the deposition of carbon or nitrogen does not occur too quickly, for a rapid deposition will produce deleterious carbide or nitride particles in the case 10.

To this end, a boost-diffuse procedure is employed. The mass flow controllers 54 remain open and the power supply 60 on for a limited duration termed the "boost" segment followed by a somewhat longer period of time in which only the vacuum pump 40 remains energized, the latter being the "diffuse" segment. During the boost segments the plasma is created and carbon or nitrogen deposits on the surfaces of the races 2 and 4 where it diffuses into the races 2 and 4. During the diffuse segment the carbon or nitrogen diffuses still further and deeper, but no additional carbon or nitrogen is introduced into the races 2 and 4. The boost and diffuse segments alternate, one immediately following the other, and throughout the boost, and diffuse cycles the heater 37 remains energized or at least supplies enough heat to the races 2 and 4 to maintain them at the carburizing temperature for the stainless steel from which they are formed. Typically each boost segment ranges between 1 and 20 minutes and each diffuse segment between 10 and 120 minutes. Total boost time should be between 4 and 400 minutes and total diffuse time should be between 60 and 1000 minutes.

Applying the plasma incrementally with sufficient time between applications to permit diffusion or dispersion of carbon or nitrogen into the races 2 and 4 deters the development of large carbides and nitrides. After all, carbon reacts quite rapidly with chromium and to a lesser extent with other alloying elements including the iron, and to avoid excessively large carbides in the cases 10 and particularly where the cases 10 form the raceways 8 of the races 2 and 4, the carbon cannot be too abundant. Large carbide particles, it will be recalled, promote spalling and this shortens the life of a bearing. Nitrogen likewise unites easily with chromium and other alloying elements and forms nitrides. Excessively large nitride particles also diminish bearing life.

Not only does the incremental application of the plasma prolong bearing life, but it also enhances resistance to corrosion. If too much carbon or nitrogen reacts with chromium to form chromium carbides or nitrides, not enough remains in solid solution to serve one of the principal purposes for the presence of chromium in the steel in the first place—that is, to provide corrosion resistance. The mass flow controllers 54 and power supply 60 when operated incrementally prevent depletion of chromium at the surface of races 2 and 4, and that of course is where it is needed most.

At this juncture the procedure for pure nitriding diverges from the procedure for carburizing or carbonitriding. Where essentially only nitrogen is diffused into the races 2 and 4 it unites with alloying elements such as chromium to form hard nitrides which provide the hardness to resist wear and indentations. But of course, care must be exercised to ensure that the nitride particles do not become too large. The nitriding process continues with the closure panel 24 being opened and the material handling device 39 entering the heating chamber 20 and engaging the baskets 36 containing the races 2 and 4. The device 39 moves the baskets 36 from the heating chamber 20 to the quenching chamber 22, whereupon the panel 24 is moved back to its closed position. Next nitrogen is admitted to the quenching chamber 22 to raise the pressure in the chamber 22 to ambient. Then the door 28 at the end of the chamber 22 is opened, and the baskets 36 with the races 2 and 4 in them are removed from the furnace B. The races 2 and 4 are thereafter ground to enhance the finish of their surfaces, particularly their raceways 8, and to bring them within dimensional tolerances.

Where carbon is the alloying agent delivered by the plasma—or is one of the alloying agents as in carbonitriding—the procedure continues. After the races 2 and 4 are carburized in the heating chamber 20, the power supply 60 is turned off and the mass flow controllers 52 are closed. The valves 42 and 44 are manipulated to equalize the pressure in the two chambers 20 and 22, but the pump 40 remains energized to maintain that pressure below 1 torr. The closure panel 24 is displaced from its normally closed position, and the handling device 39 reaches into the heating chamber 20 and moves baskets 36 over the rails 32 and into the quenching chamber 22. Here the device 39 lowers the baskets 39 into the oil at the bottom of the chamber 22 and with them the races 2 and 4. The resulting quench converts much of the austenite that is in the cases 10 of the races 2 and 4 into martensite.

Common stainless steel, such as AISI 410 and AISI 431, can withstand the oil quench without cracking. But some other stainless steels cannot. Those that cannot are simply left in the heating chamber 20 where they are allowed to cool with the chamber 20 or nitrogen is admitted to the chamber 20 to hasten cooling the races 2 and 4.

Irrespective of whether the races 2 and 4 after the plasma carburization are oil-quenched or furnace-cooled, they are thereafter heated to slightly above the upper critical temperature for the steel from which they are formed. The steel reverts to single phase austenite. Generally, the temperature ranges between 1800° F. to 2200° F. The races 2 and 4 remain at the austenizing temperature—or are allowed to soak—for 5 to 10 minutes.

After being allowed to soak in the austenitic range, the races 2 and 4 are quenched in oil. This converts much of the austenite to martensite, which is quite hard, although brittle. However, the carbon added during the plasma processing will in some instances cause the steel of the races 2 and 4 to have excessive austenite after the oil quench. This retained austenite detracts from the hardness of the races 2 and 4 and renders them unsatisfactory for bearings. To eliminate most of the retained austenite, the races 2 and 4 are cooled to cryogenic temperatures, preferably to −321° F. or lower. For example, the races 2 and 4 may be immersed in liquid nitrogen. The cryogenic cooling converts most of the retained austenite to martensite.

While some stainless steels will crack upon being quenched immediately following carburizing or carbonitriding, these steels will acquire a different microstructure when subjected to a furnace cool immediately following carburizing or carbonitriding. Upon heating to the austenite field, the readjusted microstructure enables races 2 and 4 that are formed from such steels to withstand a quench from the upper critical temperature where the steel exists as single phase austenite.

After the cryogenic cooling, the races 2 and 4 are allowed to assume ambient temperature.

Thereafter the races 2 and 4 are tempered using conventional tempering procedures. The tempering leaves the cases 10 on the races 2 and 4 reasonably hard, yet tough. Finally, the races are ground to improve their surface finishes and to bring them within dimensional tolerances.

The plasma process for producing case hardened bearing components that are corrosion-resistant possesses several advantages over the conventional process. In the conventional process, prior oxidation is necessary to produce a porous oxide film through which carbon or nitrogen will migrate. In the plasma process, no prior oxidation is required or even desired. In the conventional process one must thoroughly clean the bearing components to ensure that they are free from finger prints and other contaminants, lest the case that is eventually formed will not have a uniform thickness. The plasma process relies on hydrogen impingement to clean, and this is a less stringent and less costly procedure. The diffusion of carbon or nitrogen into the steel occurs slowly in the conventional process. Where the process relies on carbon for the formation of the case 10, the propensity to form large carbide particles is significant—and these carbide particles detract from the capacity of the metal to withstand stresses and thus shorten the life of a bearing component. They further reduce the resistance to corrosion. The plasma process deposits carbon and nitrogen onto the steel more rapidly and with greater control. Less of the carbon reacts with constituents of the steel to create carbide particles, and where they do form, the carbide particles are smaller and less detrimental to the life of bearings.

In smaller bearings the rolling elements 6 are generally formed from through-hardened steels and of course are not case hardened. Hence, the primary utility for the procedure resides in providing races 2 and 4, which have raceways 8, with hardened cases 10. But in some bearings the rolling elements 6 are case hardened, and in that instance the plasma procedure may be used to produce a case 10 on the rolling elements 6.

EXAMPLE I

Specimens of AISI 410 AND AISI 431 steel types were plasma carburized to different surface carbon concentrations and evaluated for their resistance to corrosion by water in a humidity test cabinet. For comparison purposes, some uncarburized specimens of these two materials were also humidity tested. In addition, some plasma-carburized specimens from a non-stainless steel (AISI 5120) were included in test. Finally, some specimens of the incumbent corrosion-resistant bearing material (AISI 440C) were included in the evaluation. None of the tested specimens were passivated prior to humidity testing. A list of the specimens evaluated and a compilation of the evaluation results are shown in Table 1.

TABLE 1

Corrosion Test Results

| Steel Type | Sample | Process* | No. of Rust Spots From Humidity Test |
|---|---|---|---|
| AISI 410 | 1 | Plasma-0.89% C | 7 |
| " | 2 | " | 6 |
| " | 3 | " | 4 |
| AISI 431 | 1 | Plasma-0.88% C | 2 |
| " | 2 | " | 3 |
| " | 3 | " | 1 |
| AISI 410 | 1 | Plasma-0.98% C | 12 |
| " | 2 | " | 10 |
| " | 3 | " | 6 |
| AISI 431 | 1 | Plasma-0.98% C | 8 |
| " | 2 | " | 4 |
| " | 3 | " | 2 |
| AISI 5120 | 1 | Plasma-0.46% C | 75–80% Covered |
| " | 2 | " | 75–80% Covered |
| " | 3 | " | 75 = 80% Covered |
| AISI 410 | 1 | Uncarburized-0.15% C | 1 |
| " | 2 | " | 1 |
| " | 3 | " | 1 |
| AISI 431 | 1 | Uncarburized-0.20% C | 4 |
| " | 2 | " | 4 |
| " | 3 | " | 2 |
| AISI 440C | 1 | Uncarburized-1.00% C | 2 |
| " | 2 | " | 1 |
| " | 3 | " | 2 |

*Carbon content represents proportion of carbon at surface.

The table demonstrates that the plasma carburized AISI 410 and AISI 431 steel specimens had less attack from the water vapor than did the AISI 5120 steel specimens. The plasma case-hardened steels would be suitable for bearing components in corrosive media; whereas, the conventional AISI 5120 steel would not be suitable.

It is also evident from the table that in the situation of a particular steel type, the higher surface carbon concentration specimens were attacked more than were the lower surface carbon specimens. The dependence of corrosion resistance upon surface carbon concentration is a result of the matrix of the specimens being depleted of chromium by the formation of the carbide particles. The chromium that has been removed from the solid solution because of carbide precipitation is unavailable for formation of the chromium oxide film that provides resistance to oxidation by water. So, it is of importance to keep the surface carbon concentration low in plasma-carburized stainless steel bearing components.

In addition, the table demonstrates that the plasma-carburized AISI 431 stainless steel specimens are more resistant to corrosive attack by water vapor than is the carburized AISI 410 stainless steel. This result is also attributable to the concentration of chromium remaining dissolved in the steel after plasma carburization. Before plasma carburization, there is more chromium present in the AISI 431 steel (15.0–17.0%) than in the AISI 410 stainless steel (11.5–13.0%). After plasma carburization, the two steel types have the same surface carbon concentration, but there is more chromium remaining dissolved in the AISI 431 steel. In addition to the greater amount of chromium initially present in the AISI 431 stainless steel, there is 1.25–2.50% nickel present. Thus, it is preferable to plasma carburize a low carbon stainless steel containing, as a minimum, the maximum chromium concentration existing in AISI 410 steel (13%).

It can be seen from the table that the corrosion resistance of the plasma carburized 0.88% C AISI 431 stainless steel produced for this example is approximately equal to that of the non-carburized AISI 440C stainless steel. Therefore, the plasma-carburized 0.88% C stainless steel provides the same resistance to water vapor as would the through-hardened incumbent material AISI 440C. Furthermore, the plasma carburized stainless steel provides a fracture toughness greater than that of the through-hardened AISI 440C stainless steel.

EXAMPLE II

This example demonstrates the corrosion resistance of plasma-carburized stainless steel bearing material that has been first passivated in a nitric acid solution, humidity tested, and subsequently copper sulfate tested. The results of such testing are shown in Table 2.

TABLE 2

Corrosion Test Results of Passivated Materials

| Steel Type | Process | Result of Passivation | Result of Humidity Test | Result of Copper Sulfate Test |
|---|---|---|---|---|
| 410 | Plasma-0.89% C | 2 Large etched areas | Not Tested | Not Tested |
| 431 | Plasma-0.88% C | Unattacked | Unattacked | Unattacked |
| 410 | Plasma-0.98% C | Etched | Not Tested | Not Tested |
| 431 | Plasma-0.98% C | Large etched areas | Unattacked | Unattacked |
| 5120 | Plasma-0.46% | Etched | Not Tested | Not Tested |
| 410 | Uncarburized-0.15% C | Unattacked | Unattacked | Unattacked |
| 431 | Uncarburized-0.20% C | Unattacked | Unattacked | Unattacked |
| 440 | Uncarburized-1.00% | Unattacked | Unattacked | Unattacked |

None of the uncarburized specimens were attacked by the nitric acid during the passivation treatment. On the other hand, all of the carburized steel specimens with the exception of the 0.88% C AISI 431 steel specimens were attacked by the nitric acid.

Following the passivation treatment, only the 431 steel specimens and the uncarburized specimens were subjected to the subsequent humidity and copper sulfate testing. None of these specimens were attacked by water vapor or copper sulfate. Although two of the specimens of carburized 431 stainless steel resisted the attack by water vapor and sulfate testing as well as did the AISI 440C steel specimens, the higher 0.98% C specimen of 431 stainless steel was etched by nitric acid during the passivation treatment. Thus, the preferred treatment for best corrosion resistance of plasma-carburized stainless steel is to use a higher chromium concentration as is present in 431 stainless steel (15% min.) and to keep the surface carbon concentration low (0.88% max.) Bearing components made in this manner will have equivalent corrosion resistance as the incumbent material, AISI 440C; but the fracture toughness will be superior. However, higher surface concentrations of up to 0.98% C in 431 stainless steel are acceptable in some instances.

EXAMPLE III

The objective of this example was to show the importance of post-carburization heat treatment parameters on the resultant case hardness of the stainless steel material for bearing components. Summarized in Table 3 are some results obtained by varying processing parameters on the case hardness of AISI 431 material that has been plasma-carburized using the boost—diffuse durations shown in Table 3.

TABLE 3

Effects of Carburization and Post-Carburization Parameters on Properties of AISI 431 Steel

| Specimen | Boost Period (minutes) | Diffuse Period (minutes) | Secondary Quench Temp./time (F/h) | Temper Temp./time (F/h) | Case Hardness (HRC) | Retained Austenite Fraction (%) |
|---|---|---|---|---|---|---|
| A | 34 | 855 | −120/2 | 375/2 | 57–59 | 0 |
| B | 15 | 150 | — | 350/2 | 42–46 | 21 |
| C | 30 | 300 | — | " |  | 78 |
| D | 34 | 735 | — | " | 43–46 | 87 |
| E | 24 | 795 | — | " | 44–45 | 64 |
| F | 34 | 735 | −120/2 | " | 58–59 | 18 |
| G | 24 | 795 | " | " | 58 | 13 |
| H-1 | 24 | 795 | −120/2 | 350/1 | 58–59 | 37 |
| H-2 | " | " | " | 325/1 | 59–60 | 38 |
| H-3 | " | " | −321/0.5 | 350/1 | 59 | 33 |
| H-4 | " | " | " | 325/1 | 59 | 33 |
| I-1 | 26 | 870 | −120/2 | 350/1 | 58–59 | 11 |
| I-2 | " | " | " | 300/1 | 59–60 | 13 |
| I-3 | " | " | −321/0.5 | 350/1 | 58–59 | 10 |
| I-4 | " | " | " | 300/1 | 60 | 7 |
| J-1 | 20 | 915 | −120/2 | 35011 | 58–59 | 9 |
| J-2 | " | " | " | 300/1 | 58–59 | 7 |
| J-3 | " | " | −321/0.5 | 350/1 | 58–59 | 6 |
| J-4 | " | " | " | 300/1 | 59–60 | 5 |

The dependence of the bearing material's resultant case hardness and fraction of retained austenite on carburization and post-carburization parameters is evident in Table 3. For example, it can be seen, from the results obtained in specimens B, C, D, and E compared to the results obtained from the other specimens, that the case hardness is increased and the fraction of retained austenite is reduced significantly by secondary quenching to either −120° F. or −321° F. Although the case hardness and fraction of retained austenite can be controlled favorably by cooling to either −120° F. or 321° F., the cooling to −321° F. is preferred because the minimum resultant hardness is greater than is the situation when cooling to −120° F.

It can also be seen in Table 3 that the tempering temperature has an effect upon the resultant case hardness and retained austenite fraction. Comparing the hardness range of specimen I-4 to that of I-2 or that of specimen J-4 to that of J-2, it can be seen that the case hardness has increased and the fraction of retained austenite has decreased further by cooling the material an additional 200° F. and reducing the tempering temperature an additional 50° F. Consequently, the preferred practice is to cool the bearing material to −321° F. and temper the bearing material at 300° F.

This invention is intended to cover all changes and modifications of the example of the invention herein chosen for purposes of the disclosure which do not constitute departures from the spirit and scope of the invention.

What is claimed is:

1. A corrosion resistant bearing component having a core and a case over the core with the case being harder than the core, the core comprising iron, 0.05% to 0.50% by weight carbon, and at least 11% by weight chromium, the case having a greater amount of martensite or nitrides than the core as a consequence of carbon or nitrogen having been diffused into the bearing component while subjected to a plasma containing carbon or nitrogen or both, the carbon content of the case at its surface not exceeding about 0.98% by weight.

2. A bearing component according to claim 1 and further characterized by having been subjected to ion impingement which cleans its surface prior to having been subjected to a plasma containing carbon or nitrogen.

3. A bearing component according to claim 2 and further characterized by having been subjected to the plasma containing carbon or nitrogen on an intermittent basis while at elevated temperatures.

4. A bearing component according to claim 3 and further characterized by having been cooled after being subjected to the plasma containing carbon or nitrogen, thereafter heated to a temperature sufficient to transform the steel in the core to austenite, and then quenched.

5. A bearing component according to claim 4 and further characterized by having been cooled to cryogenic temperatures after having been quenched.

6. A process for producing a corrosion resistant bearing component, said process comprising cleaning the surface of a steel shape having the configuration generally required for the component, the steel of the shape comprising iron, less than 0.50% by weight carbon and more than about 11% by weight chromium; thereafter subjecting the steel shape with its cleaned surface to a plasma containing carbon or nitrogen or both while the shape is at an elevated temperature exceeding 900° F., all for sufficient time to enable carbon or nitrogen or both to diffuse into the shape and create a case over a core, the core having the constituency of the original shape and the case having a greater content of carbon or nitrogen or both than the core, but not exceeding about 0.98% carbon by weight at the surface; and cooling the shape to a temperature less than that at which it existed while being subjected to the plasma.

7. The process according to claim 6 wherein the shape is subjected to the plasma containing carbon or nitrogen on an intermittent basis.

8. The process according to claim 6 intervals between the generation of the plasma containing carbon or nitrogen exceeds the intervals during which the shape is subjected to the plasma.

9. A process according to claim 6 wherein step of cleaning the shape comprises subjecting the shape to ion impingement in an atmosphere that is essentially devoid of oxygen.

10. A process according to claim 9 and further comprising heating the shape to an elevated temperature before subjecting the shape to ion impingement.

11. A process according to claim 10 wherein the pressure of the atmosphere in which the ion impingement occurs does not exceed 10 torr.

12. A process for producing a corrosion resistant bearing component, said process comprising cleaning the surface of a steel shape having the configuration generally required for the component, the steel of the shape comprising iron, less than 0.50% by weight carbon and more than about 11% by weight chromium; thereafter subjecting the steel shape with its cleaned surface to a plasma containing carbon or nitrogen or both while the shape is at an elevated temperature exceeding 900° F., all for sufficient time to enable carbon or nitrogen or both to diffuse into the shape and create a case over a core, the core having the constituency of the original shape and the case having a greater content of carbon or nitrogen or both than the core; thereafter elevating the temperature of the shape sufficiently to transform the steel of the shape into austenite; and thereafter quenching the shape.

13. A process according to claim 6 wherein the step of cooling the shape includes quenching the shape in oil.

14. A process according to claim 12 wherein the step of quenching the shape includes immersing the shape in oil.

15. A process according to claim 14 and further comprising subjecting the shape to cryogenic temperatures after it is quenched to convert retained austenite into martensite.

16. A process according to claim 14 and further comprising tempering the steel of the shape after it is quenched.

17. A bearing component according to claim 1 wherein the case contains less than about 18% retained austenite.

18. A process according to claim 6 wherein the case contains less than about 18% retained austenite.

* * * * *